United States Patent [19]
Appel

[11] Patent Number: 5,933,182
[45] Date of Patent: Aug. 3, 1999

[54] SINGLE PASS COLOR PRINTER WITH FACET MATCHING

[75] Inventor: James J. Appel, Rochester, N.Y.

[73] Assignee: Xerox Corporation, Stamford, Conn.

[21] Appl. No.: 09/004,460

[22] Filed: Jan. 8, 1998

[51] Int. Cl.⁶ .................................................. B41J 2/435
[52] U.S. Cl. .......................... 347/234; 347/248; 347/235; 347/250; 347/261; 359/216; 359/226
[58] Field of Search ..................................... 347/250, 260, 347/261, 118, 234; 250/235; 359/224, 216, 226

[56] References Cited

U.S. PATENT DOCUMENTS

| | | | |
|---|---|---|---|
| 5,498,869 | 3/1996 | Appel et al. | 250/236 |
| 5,674,656 | 10/1997 | Maniar | 430/137 |

*Primary Examiner*—N. Le
*Assistant Examiner*—Hai C. Pham
*Attorney, Agent, or Firm*—John M. Kelly

[57] ABSTRACT

Color banding resulting from facet-to-facet jitter in a color imaging device having a plurality of multifaceted polygons is reduced by matching the facets of the various polygons such that the composite image produced by the matched facets result in minimal color banding. The latent images are registered by starting each latent image with a selected "starting" facet such that the matched facets trace corresponding scan lines. Imaging offsets that would result from either advancing or retarding the exposure of a latent image such that the latent images begin with the correct facet are compensated for by moving a rotating cylinder mirror in each polygon such that the latent images are registered. Moving of the cylinder mirror is beneficially achieved using a controlled piezoelectric element.

18 Claims, 3 Drawing Sheets

SINGLE PASS COLOR PRINTER WITH FACET MATCHING

FIELD OF THE INVENTION

This invention relates to electrophotographic devices that use multiple polygon scanners. In particular, this invention relates to a method of reducing color banding caused by facet-to-facet jitter in electrophotographic devices that use multiple polygon scanners.

BACKGROUND OF THE INVENTION

Electrophotographic marking is a well known and commonly used method of copying or printing documents. Electrophotographic marking is performed by exposing a light image representation of a desired document onto a substantially uniformly charged photoreceptor. In response to that light image the photoreceptor discharges, creating an electrostatic latent image of the desired document on the photoreceptor's surface. Toner particles are then deposited onto that latent image, forming a toner image. That toner image is then transferred from the photoreceptor onto a substrate such as a sheet of paper. The transferred toner image is then fused to the substrate, usually using heat and/or pressure, thereby creating a copy of the desired image. The surface of the photoreceptor is then cleaned of residual developing material and recharged in preparation for the production of another image.

The foregoing broadly describes a prototypical black and white electrophotographic printing machine. Electrophotographic marking can also produce color images by repeating the above process once for each color of toner that is used to make the composite color image. The various color toners can then be transferred onto a substrate in a superimposed registration such that a desired composite color image results. That composite color image can then be fused to make a permanent image.

One way of exposing a photoreceptor is to use a Raster Output Scanner (ROS). A ROS is comprised of a light source (or sources) and a rotating polygon that has a plurality of mirrored facets. The light source radiates a laser beam onto the polygon facets, which reflects the beam onto the photoreceptor so as to produce a light spot. As the polygon rotates the light spot traces lines, referred to as scan lines, on the photoreceptor. Since the photoreceptor itself usually moves, the surface of the photoreceptor is raster scanned by the light spot. During scanning the laser beam is modulated so as to produce a latent image on the photoreceptor.

Numerous printing architectures are available for producing composite color images using ROS technology. Significant to the present invention are ROS-based single pass printers wherein a composite color image is produced in a single pass of the photoreceptor through the machine. Single pass ROS-based printers are advantageous in that they are very fast since a color image is produced during each cycle of the photoreceptor.

While raster output scanning is successful, it is not without problems. One set of problems results from facet imperfections. While each polygon facet is ideally perfectly flat, perfectly parallel to the axis of rotation of the polygon, exactly the same as the other facets, and forms the same angle with its adjacent facets, in practice these ideals are not achieved. When multiple polygons are used the number of facet imperfections increases since there are more facets. The various imperfections result in nonuniform scan lines. While start of scan detectors enable the adjustment of the scan lines such that the scan line latent images align along one edge, this does little to help other problems resulting from facet imperfections. For example, non-flat facets result in spatial nonuniformity: the spot is not where it should be at a particular time. Additionally, facet angle errors result in scan lines that trace across the photoreceptor at different rates and that end at different times. Color print testing performed at Xerox has proven that facet imperfections result in color defects that are referred to herein as color banding: color image to color image misregistration in the final image. In multiple polygon electrophotographic printers this problem is compounded by polygon to polygon differences as well as by the facet to facet differences within a single polygon. Therefore, a technique of reducing color banding in multiple polygon single pass electrophotographic printers would be beneficial.

SUMMARY OF THE INVENTION

This invention relates to a technique of reducing color banding in a composite color image which is comprised of a plurality of superimposed raster scanned color images that are produced using a plurality of multi-faceted rotating polygons. According to the principles of the present invention an individual facet on each of the polygons is selected to be the starting facet. The first scan line of each color image is produced using the starting facet of the polygon that produces that color image. The starting facet of each polygon is selected from the other facets such that color banding in the composite image is minimized. The scan line offsets that are required to properly register each color image are produced using a cylinder mirror that is rotated by a piezo-electric element.

BRIEF DESCRIPTION OF THE DRAWINGS

Other aspects of the present invention will become apparent as the following description proceeds and upon reference to the following drawings, in which like reference numerals identify like elements and wherein.

DETAILED DESCRIPTION OF AN EMBODIMENT OF THE INVENTION

Figure 1:
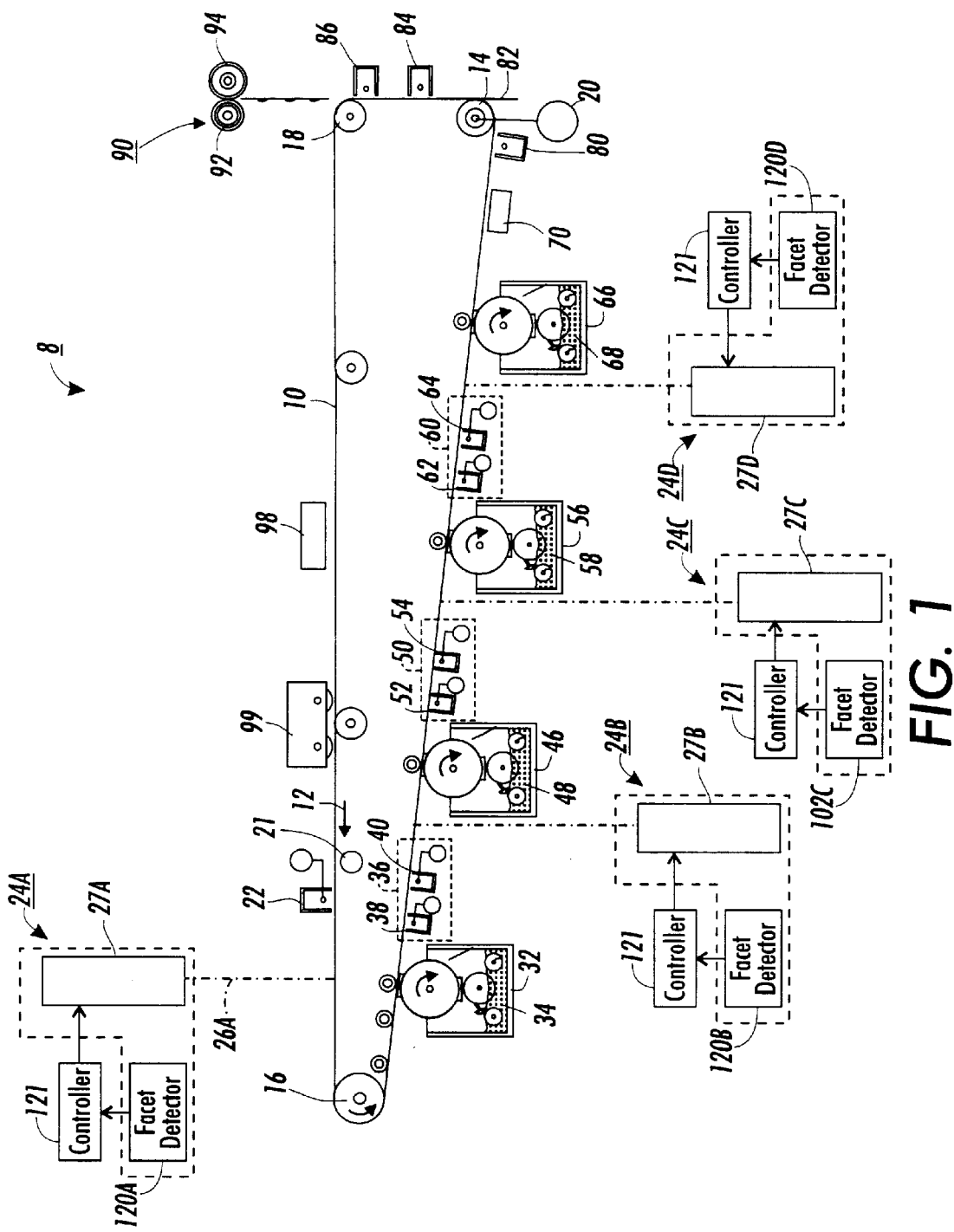
FIG. 1 shows an electrophotographic printing machine that incorporates the principles of the present invention.

FIG. 1 illustrates an electrophotographic printing machine 8 that is in accord with the principles of the present invention. The printing machine 8 is a single pass, Recharge-Expose-and-Develop, Image-on-Image (Read IOI) printer. However, it is to be understood that the present invention is applicable to other types of systems. For example, the present invention may find use in single pass color printers in which the Recharge-Expose-and-Develop, Image-on-Image process is not used. Such printers often use intermediate transfer belts and produce color images that are individually transferred onto the intermediate transfer belt. Therefore, it is to be understood that the following description of the printing machine 8 is only to assist the understanding of the principles of the present invention.

The printing machine 8 includes an Active Matrix (AMAT) photoreceptor belt 10 which travels in the direction indicated by the arrow 12. Belt travel is brought about by mounting the photoreceptor belt about a driven roller 14 and tension rollers 16 and 18. The driven roller 14 is driven by a motor 20.

As the photoreceptor belt travels each part of it passes through each of the subsequently described process stations. For convenience, a single section of the photoreceptor belt, referred to as the image area, is identified. The image area is that part of the photoreceptor belt which is to receive the various actions and toner layers which produce the final composite color image. While the photoreceptor belt may have numerous image areas, since each image area is processed in the same way a description of the processing of one image area suffices to explain the operation of the printing machine 8.

The imaging process begins with the image area passing a "precharge" erase lamp 21 that illuminates the image area so as to cause any residual charge which might exist on the image area to be discharged. Such erase lamps are common in high quality systems and their use for initial erasure is well known.

As the photoreceptor belt continues its travel the image area passes a charging station comprised of a DC corotron 22. The DC corotron charges the image area in preparation for exposure to create a latent image for black toner. For example, the DC corotron might charge the image area to a substantially uniform potential of about −500 volts. It should be understood that the actual charge placed on the photoreceptor will depend upon many variables, such as the black toner mass that is to be developed and the settings of the black development station (see below).

After passing the charging station the image area advances to an exposure station 24A. At the exposure station the charged image area is exposed to a modulated laser beam 26A from a raster output scanner 27A that raster scans the image area such that an electrostatic latent representation of a black image is produced. Significantly, the modulation of the laser beam 26A is controlled such that the first scan line of the black latent image is scanned using a predetermined "first" facet of a rotating polygon. The printing machine 8 departs from prior art printing machines most directly with regards to the raster output scanner 27A (and with regards to the raster output scanners 27B, 27C, and 27D that are described below). A more detailed description of the raster output scanner 27A is given subsequently.

Still referring to FIG. 1, after passing the exposure station 24A the exposed image area with the black latent image passes a black development station 32 that advances black toner 34 onto the image area so as to develop a black toner image. While the black development station 32 could be a magnetic brush developer, a scavengeless developer may be somewhat better. One benefit of scavengeless development is that it does not disturb previously deposited toner layers. Biasing is such as to effect discharged area development (DAD) of the lower (less negative) of the two voltage levels on the image area. The charged black toner 34 adheres to the exposed areas of the image area, thereby causing the voltage of the illuminated parts of the image area to be about −200 volts. The non-illuminated parts of the image area remain at about −500 volts.

After passing the black development station 32 the image area advances to a recharging station 36 comprised of a DC corotron 38 and an AC scorotron 40. The recharging station 36 recharges the image area and its black toner layer using a technique known as split recharging. Split recharging is described in U.S. Pat. No. 5,600,430, which issued on Feb. 4, 1997, and which is entitled, "Split Recharge Method and Apparatus for Color Image Formation." Briefly, the DC corotron 38 overcharges the image are to a voltage level greater than that desired when the image area is recharged, while the AC scorotron 40 reduces that voltage level to that which is desired. Split recharging serves to substantially eliminate voltage differences between toned areas and untoned areas and to reduce the level of residual charge remaining on the previously toned areas. This benefits subsequent development by different toners.

The recharged image area with its black toner layer then advances to an exposure station 24B. There, a laser beam 26B from a raster output scanner 27B exposes the image area to produce an electrostatic latent representation of a yellow image. Significantly, the modulation of the laser beam 26B is controlled such that the first scan line of the yellow image is scanned using a predetermined "first" facet of a rotating polygon. The operation of the exposure station 24B is described subsequently.

The now re-exposed image area then advances to a yellow development station 46 that deposits yellow toner 48 onto the image area. After passing the yellow development station the image area advances to a recharging station 50 where a DC scorotron 52 and an AC scorotron 54 split recharge the image area.

The recharged image area is then exposed by an exposure station 24C. A modulated laser beam 26C from a raster output scanner 27C exposes the image area to produce an electrostatic latent representation of a magenta image. Significantly, the modulation of the laser beam 26C is controlled such that the first scan line of the magenta image is scanned using a predetermined "first" facet of a rotating polygon. Again, the operation of the exposure station 24C is described subsequently.

After passing the magenta exposure station the now re-exposed image area advances to a magenta development station 56 that deposits magenta toner 58 onto the image area. After passing the magenta development station the image area advances another recharging station 60 where a DC corotron 62 and an AC scorotron 64 split recharge the image area.

The recharged image area with its toner layers then advances to an exposure station 24D. There, a laser beam 26D from a raster output scanner 27D exposes the image area to produce an electrostatic latent representation of a cyan image. Significantly, the modulation of the laser beam 26D is controlled such that the first scan line of the cyan image is scanned using a predetermined "first" facet of a rotating polygon. The operation of the exposure station 24D is described in more detail subsequently.

After passing the exposure station 24D the re-exposed image area advances past a cyan development station 66 that deposits cyan toner 68 onto the image area. At this time four colors of toner are on the image area, resulting in a composite color image. However, the composite color toner image is comprised of individual toner particles which have charge potentials which vary widely. Directly transferring such a composite toner image onto a substrate would result in a degraded final image. Therefore it is beneficial to prepare the composite color toner image for transfer.

To prepare for transfer a pretransfer erase lamp 70 discharges the image area to produce a relatively low charge level on the image area. The image area then passes a pretransfer DC scorotron 80 which performs a pre-transfer charging function. The image area continues to advance in the direction 12 past the driven roller 14. A substrate 82 is then placed over the image area using a sheet feeder (which is not shown). As the image area and substrate continue their travel they pass a transfer corotron 84 that applies positive ions onto the back of the substrate 82. Those ions attract the negatively charged toner particles onto the substrate.

As the substrate continues its travel is passes a detack corotron 86. That corotron neutralizes some of the charge on the substrate to assist separation of the substrate from the photoreceptor 10. As the lip of the substrate 82 moves around the tension roller 18 the lip separates from the photoreceptor. The substrate is then directed into a fuser 90 where a heated fuser roller 92 and a pressure roller 94 create a nip through which the substrate 82 passes. The combination of pressure and heat at the nip causes the composite color toner image to fuse into the substrate. After fusing, a chute, not shown, guides the substrate to a catch tray, also not shown, for removal by an operator.

After the substrate 82 is separated from the photoreceptor belt 10 the image area continues its travel and passes a preclean erase lamp 98. That lamp neutralizes most of the charge remaining on the photoreceptor belt. After passing the preclean erase lamp the residual toner and/or debris on the photoreceptor is removed at a cleaning station 99. The image area then passes once again to the precharge erase lamp 21 and the start of another printing cycle.

As previously indicated, the differences between prior art printing machines and the printing machine 8 most directly relate to the raster output scanners. A more detailed description of the raster output scanners and their operation is given with the assistance of FIGS. 2 and 3. Turn now to FIG. 2 for a visual depiction of the scanning of the photoreceptor 10. As described above the exposure station 24A produces a black latent image, the exposure station 24B produces a yellow latent image, the exposure station 24C produces a magenta latent image, the exposure station 24D produces a cyan latent image.

Each of the exposure stations is controlled by a controller 121. That controller applies modulation signals to laser drivers 105X in the various exposure stations 24X via a line 130X, where X is understood as referring to one of the letters A, B, C, or D. For example, the controller supplies modulation signals to a laser driver 105A in the exposure station 24A via a line 130A. Since all of the exposure stations operate the same, the designator X will be used to refer to any of the illustrated exposure stations. The laser drivers 105X cause an laser diode 104X to emit laser light 26X.

Figure 2:
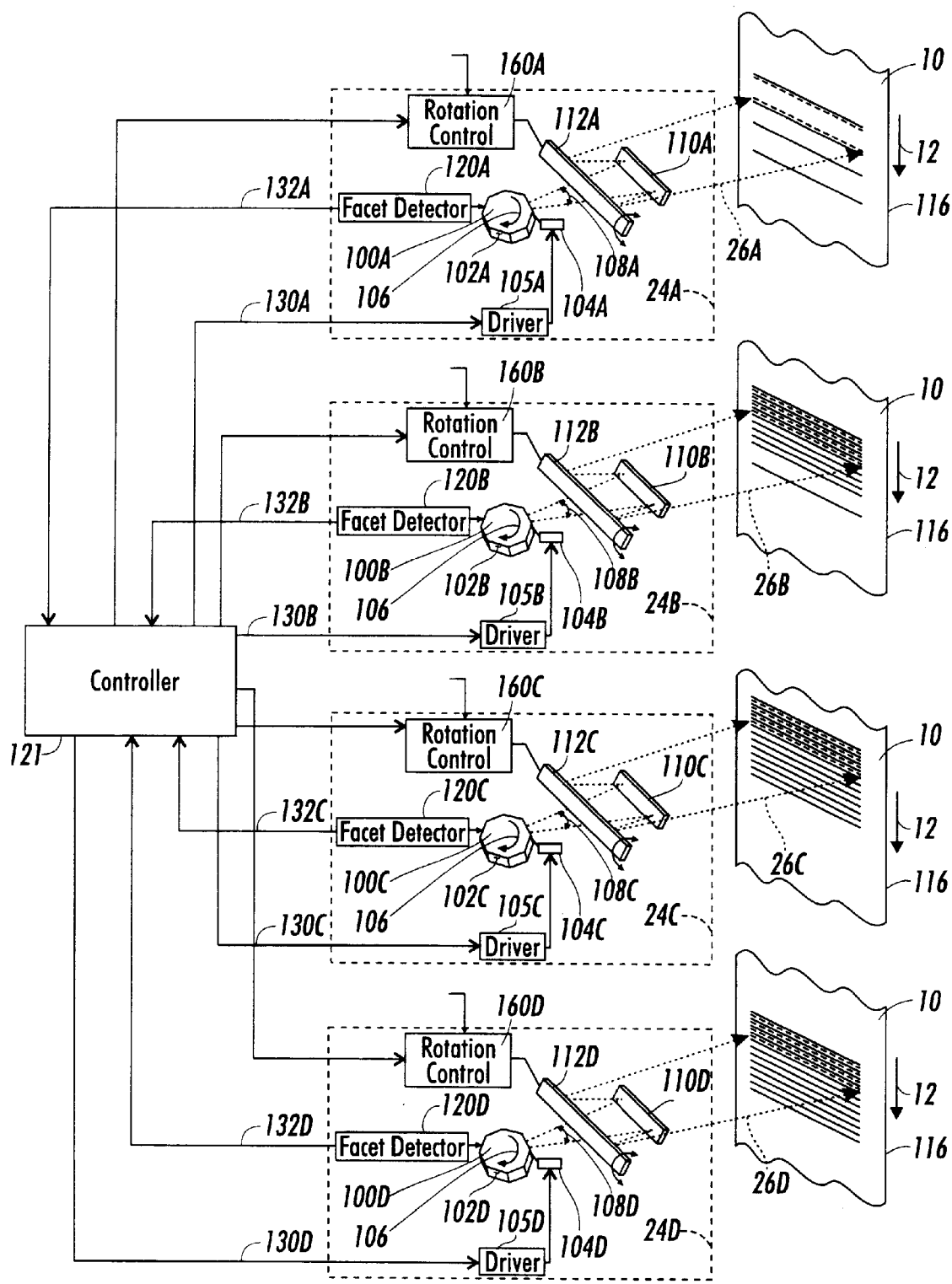
FIG. 2 illustrates multiple, multifaceted raster output scanners in operation raster scanning a photoreceptor.

Still referring to FIG. 2, each exposure station also includes a polygon 100X that has a plurality of facets 102X. That polygon rotates in the direction 106 (which is the same direction for each of the polygons). The laser beam 26X illuminates the facets, which causes the laser beam 26X to sweep through an angle 108. As mentioned in the "Background of the Invention" the polygon facets are not perfect. Therefore, the angle 108X varies slightly from facet to facet and from polygon to polygon. The sweeping laser beam 26X reflects from a first mirror 110X and from a rotating cylinder mirror 112X. Finally the sweeping beam 26X sweeps a scan line on the photoreceptor 10.

Those facet imperfections cause scan line nonuniformities that create color banding. Each of the four polygons has eight facets, for a total of 32 facets. Since color banding results primarily from mismatches between adjacent scan lines in the composite image, and since those adjacent scan lines are produced using other polygons, it should be apparent that various combinations of polygon facets result in varying degrees of color banding. Importantly, there is a set of facets, one facet from each polygon, which results in minimum overall color banding. That is, there is a set of facets, one facet from each polygon, such that if the first scan line of each latent is produced using the facet which is a member of the set, color banding is minimized. Basically, there is a best facet in each polygon to start with.

To determine when a particular facet is in position to produce a scan line each erase station 24X includes a facet detector 120X that detects when a predetermined facet is in position to be illuminated by a laser 104X. Each facet detector applies a synchronizing signal to the controller 121 via a line 132X. The controller 121 then applies modulation signals to the laser driver 105X when the proper facet is in position to start a new latent image. That is, modulation is synchronized with the facets. Since each latent image has the same number of scan lines as the other latent images, beginning each latent image with the same means that the scan lines in the various images are produced such that color banding is minimized.

Simply synchronizing latent images such that the first scan line of each image is produced using the proper facet would create significant scan line offset errors. To understand this, consider that if the proper facet is not illuminated when the image area is in a position such that its latent image is properly registered (that is, in an overlapping relationship so as to arrive at the desired composite image) with the other latent images, then synchronization requires that the modulation of the laser beam will have to adjusted until the correct facet is illuminated. Adjustment might be performed by either advancing or retarding the modulation. However, by advancing or retarding modulation the image area, which is advancing in the direction 12, is no longer properly registered. Simply adjusting the laser modulation would cause scan line errors in the process direction 12. The resulting color defect likely would be worse than the color banding problem addressed by the present invention.

Figure 3:
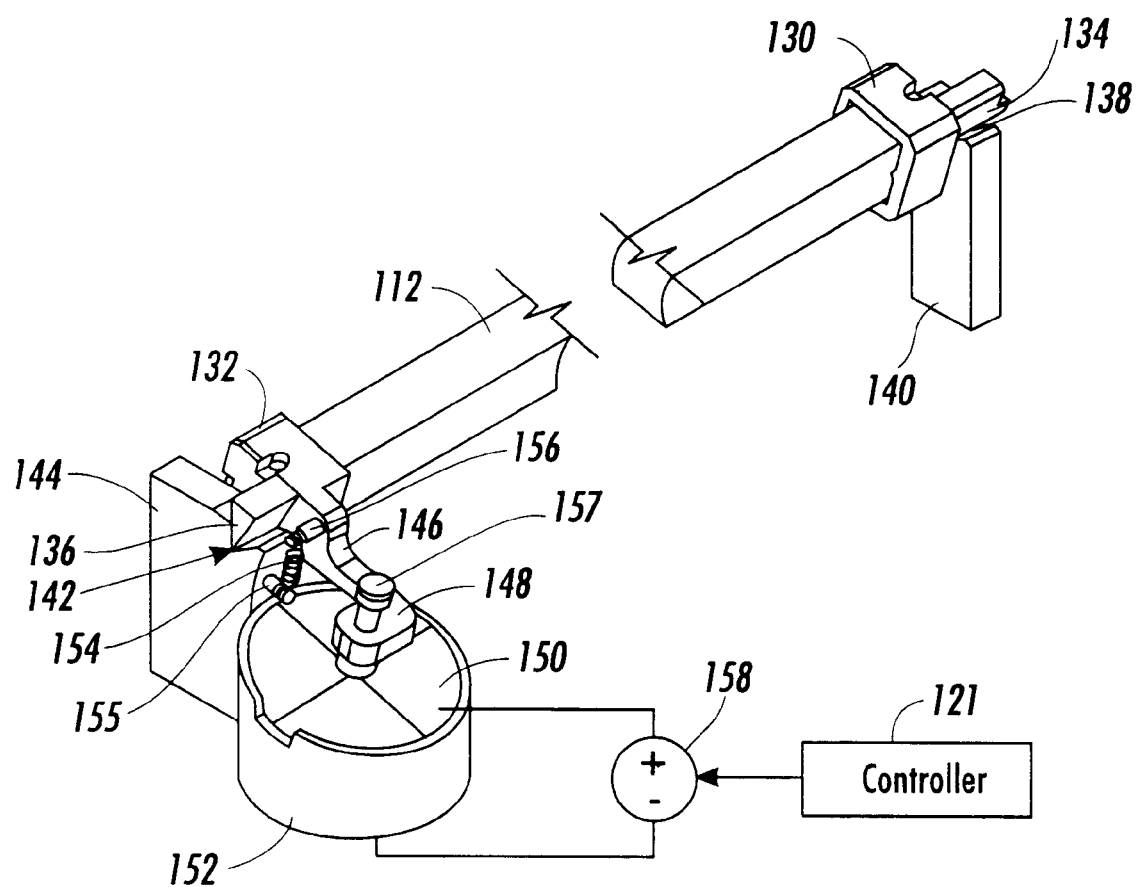
FIG. 3 illustrates a system for producing the scan line offsets that register the raster scanned color images.

The printing machine 8 corrects for image offsets by adjusting the positions of the scan lines in the process direction. To accomplish this each raster output scanner 27X includes a scan line adjusting scheme wherein the cylindrical mirrors 112X are controllably rotated in a manner that is explained with reference to FIG. 3. Since each raster output scanner includes the same assembly shown in FIG. 3, for clarity the elements of FIG. 3 are not designated with alphabetic suffixes. As shown, end caps 130 and 132 are placed on each cylindrical mirror 112. The end cap 130 includes a knife edge 134 while the end cap 132 has a knife edge 136. The knife edge 134 fits into a notch 138 of a stand 140, and the knife edge 136 fits into a notch 142 of a stand 144. The cylinder mirror thus pivots about the notches 138 and 142.

The end cap 132 also includes a lever arm 146 that terminates in a threaded coupling 148. Below the threaded coupling is a piezoelectric element 150 in a support 152. A spring 154 stretched between a stand pin 155 and a lever pin 156 biases the lever arm toward the piezoelectric element 150. A screw 157 passing through a threaded coupling contacts the piezoelectric element. By adjusting the screw 157 the initial rotation of the cylinder mirror can be adjusted to produce a scan line at a desired position.

Still referring to FIG. 3, a controlled voltage source 158 is applied to the piezoelectric element. As is well known, a voltage bias applied to a piezoelectric element causes the piezoelectric element to expand or contract, depending upon the polarity. Therefore, in the arrangement shown in FIG. 3 the controlled voltage source causes the cylindrical mirror 112 to pivot (rotate) as a function of the applied voltage.

To correct for process direction offsets resulting from either advancing or delaying the modulation applied to the laser such that the desired polygon facet produces the first scan line in an image, the controller 121 causes the controlled voltage source 158 to apply a voltage bias to the piezoelectric element 150 such that the cylinder mirror pivots (rotates) the proper amount such that the first scan line is registered with the first scan line of all of the other images. By facet tracking using the facet detector 120, by knowing the speed of the photoreceptor in the direction 12, and by knowing the characteristics of the piezoelectric element it is a simple matter to program the controller 121 to determine the required voltage bias.

It is to be understood that while the figures and the above description illustrate the present invention, they are exemplary only. Others who are skilled in the applicable arts will recognize numerous modifications and adaptations of the illustrated embodiments which will remain within the principles of the present invention. Therefore, the present invention is to be limited only by the appended claims.

What is claimed:

1. An image forming apparatus, comprising:
   a charged photoreceptor moving in accordance with a motion signal;
   a plurality of raster output scanners, each of which includes:
      a light source emitting a light beam that is modulated in accordance with a modulation signal;
      a rotating polygon having a plurality of facets for reflecting the emitted light beam;
      a cylindrical mirror for directing the light beam from said rotating polygon onto said moving photoreceptor;
      a rotation inducing element responsive to a position signal, said rotation inducing element causing said cylindrical mirror to rotate about an axis in response to said position signal; and
      a facet determining element producing a synchronization signal when a predetermined facet is reflecting light onto said cylindrical mirror; and
   a controller producing said motion signal, said controller also producing a modulation signal for each of said plurality of raster output scanners such that each raster output scanner forms a latent image comprised of a first scan line followed by a plurality of subsequent scan lines on said photoreceptor;
   wherein said controller receives said synchronization signal from each of said plurality of raster output scanners, wherein said controller uses said synchronization signals to produce said modulation signal for each of said plurality of raster output scanners such that the first scan line of each latent image is produced by said predetermined facet of each of said plurality of raster output scanners, and wherein said controller produces said position signal for each of said plurality of raster output scanners such that the latent images from said plurality of raster output scanners are registered.

2. An image forming apparatus according to claim 1, wherein said predetermined facet of each of said plurality of raster output scanners is selected to minimize a color defect.

3. An image forming apparatus according to claim 1, wherein said predetermined facet minimizes color banding.

4. An image forming apparatus according to claim 1, wherein at least one rotation inducing element includes a piezoelectric element.

5. An image forming apparatus according to claim 1, further including a mounting assembly for at least one cylindrical mirror.

6. An image forming apparatus according to claim 5, wherein at least one rotation inducing element includes a piezoelectric element.

7. An image forming apparatus according to claim 6, wherein said mounting assembly includes a lever arm and a spring, wherein an end of said lever arm contacts said rotation inducing element and where said spring biases said level arm toward said rotation inducing element.

8. An image forming apparatus, comprising:
   a charged photoreceptor moving in accordance with a motion signal;
   a plurality of raster output scanners, each raster output scanner including:
      a light source emitting a light beam that is modulated in accordance with a modulation signal so as to produce a latent image on said photoreceptor;
      a rotating polygon having a plurality of facets for reflecting the emitted light beam;
      a cylindrical mirror for directing the light beam from said rotating polygon onto said moving photoreceptor;
      a rotation inducing element responsive to a position signal, said rotation inducing element causing said cylindrical mirror to rotate about an axis in response to said position signal; and
      a facet determining element producing a synchronization signal when a predetermined facet of said plurality of facets is reflecting light onto said cylindrical mirror;
   a plurality of developing stations, each developing station for depositing toner on a latent image produced by one of said plurality of raster output scanners; and
   a controller producing said motion signal, said controller also producing a modulation signal for each of said plurality of raster output scanners such that each raster output scanner forms a latent image comprised of a first scan line followed by a plurality of subsequent scan lines on said photoreceptor;
   wherein said controller receives said synchronization signal from each of said plurality of raster output scanners, wherein said controller uses said synchronization signals to produce said modulation signal for each of said plurality of raster output scanners such that the first scan line of each latent image is produced by said predetermined facet, and wherein said controller produces said position signal for each of said plurality of raster output scanners such that the latent images produced by said plurality of raster output scanners are registered.

9. A color printing machine according to claim 8, further including a transfer station for transferring toner onto a substrate.

10. A color printing machine according to claim 9, further including a fusing station for fusing transferred toner with a substrate.

11. An image forming apparatus according to claim 8, wherein said predetermined facet of each of said plurality of raster output scanners is selected to minimize a color defect.

12. An image forming apparatus according to claim 11, wherein said color defect is color banding.

13. An image forming apparatus according to claim 8, wherein at least one rotation inducing element includes a piezoelectric element.

14. A color printing machine according to claim 8, further including at least one mounting assembly for a cylindrical mirror.

15. A color printing machine according to claim 14, wherein at least one rotation inducing element includes a piezoelectric element.

16. A color printing machine according to claim 15, wherein said at least one mounting assembly includes a lever arm and a spring, wherein an end of said lever arm contacts said rotation inducing element and where said spring biases said level arm toward said rotation inducing element.

17. A method of producing a color image comprising the steps of:

produces a plurality of latent images, each of which is comprised of a first scan line and a plurality of subsequent scan lines, on a moving photoreceptor using a plurality of light sources and a plurality of multifaceted rotating polygons, each of which produces a sweeping beam of light that is reflected from a predetermined one of a plurality of rotatable cylinder mirrors;

identifying a polygon facet of each of said plurality of rotating polygons;

producing the first scan line of each of said plurality of latent images using an identified polygon facet; and registering said plurality of latent images by rotating said cylinder mirrors.

18. The method according to claim 17, wherein the step of identifying a polygon facet includes the step of determining which polygon facet of a plurality of polygon facets minimizes a color defect.

* * * * *